Patented Apr. 22, 1924.

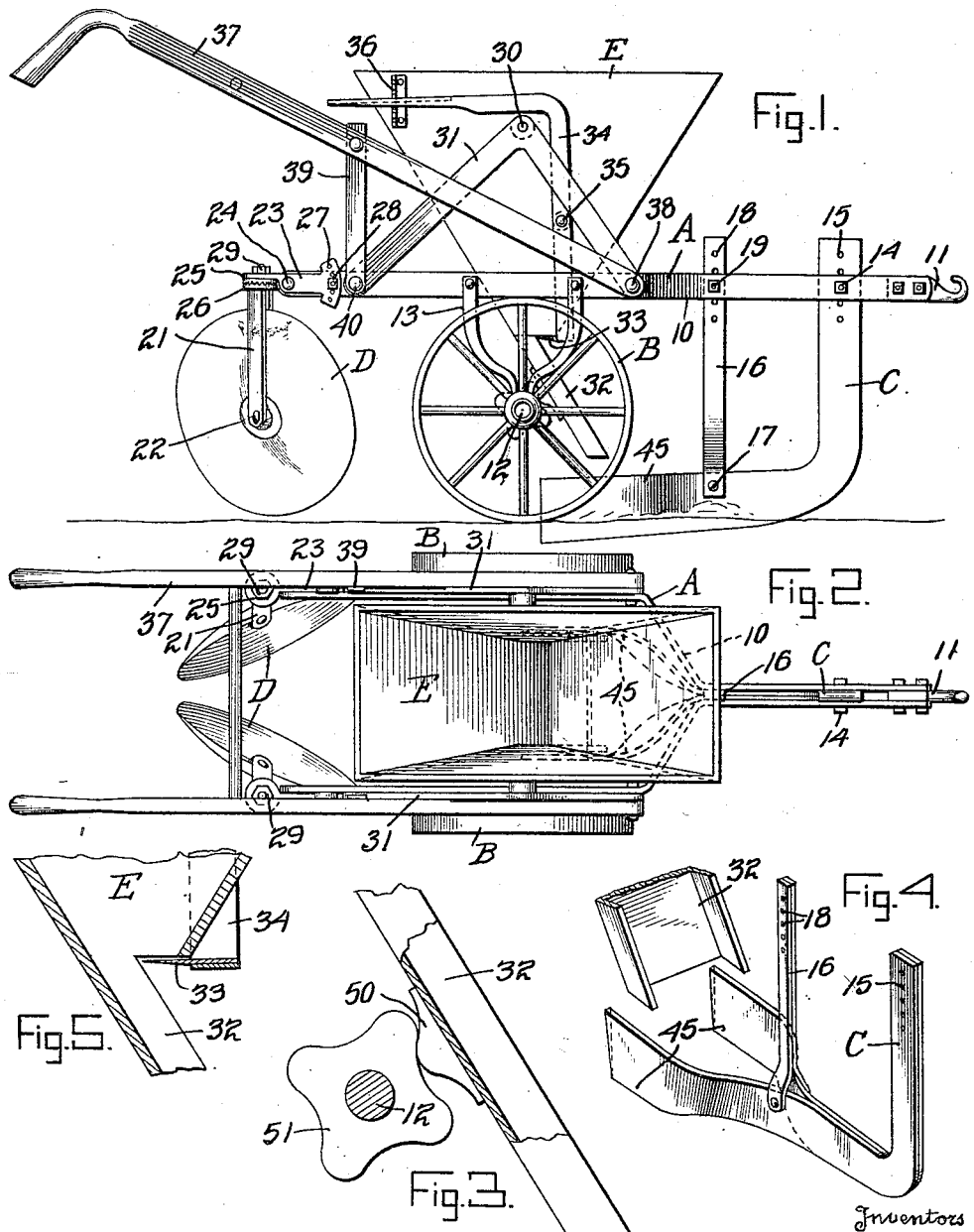

1,491,624

UNITED STATES PATENT OFFICE.

VINCE S. POLK, JOHN B. HUNT, AND WILMER P. DAVIS, OF WAUCHULA, FLORIDA.

FERTILIZER DISTRIBUTOR.

Application filed September 2, 1921. Serial No. 497,985.

*To all whom it may concern:*

Be it known that we, VINCE S. POLK, JOHN B. HUNT, and WILMER P. DAVIS, citizens of the United States, residing at Wauchula, in the county of Hardee and State of Florida, have invented certain new and useful Improvements in Fertilizer Distributors, of which the following is a specification.

In the distribution of fertilizer prior to the planting of seed one of the faults of the distributors of the several types now in use is that the fertilizer is dropped in a narrow stream or ridge, concentrating the fertilizer in the center of the row and bringing it and its full action in direct contact with the seed often to the injury of the seed and, further, with the result that the greatest benefits and most advantageous results to the plants are not secured. The types of fertilizer distributors in use also have a tendency to pack the dirt over the fertilizer after being covered, which is undesirable and not to the advantage of cultivation of many classes of vegetables, such particularly as cucumbers and watermelon.

The object of our said invention is to provide a fertilizer distributor by which the fertilizer will be spread thinly over a wide space in the furrow and by which it may be covered so that the dirt will lay lightly over the same, thus preparing the furrow in a most advantageous manner for receiving the seed and propagating the same. This and other objects incident to the construction and relative arrangement of parts will be more fully pointed out in the following description:

Referring to the accompanying drawings which are made a part hereof and on which similar reference characters indicate similar parts, Figure 1 is a side elevation of a fertilizer embodying our said improvements, Figure 2 a plan view of the same, Figure 3 a detail of a portion on an enlarged scale, Figure 4 a detail perspective, and Figure 5 another detail view showing certain other parts on an enlarged scale.

In said drawings the portions marked A represent the supporting frame, B the supporting wheel, C the furrow opener, D the covering disks, and E the hopper.

The frame A is one of a common type consisting of side bars spaced apart at their rear end and bent at their forward ends to form angle portions 10 which come practically together and extend forward for a distance forming a beam, being secured at the front ends by bolts with an attaching hook 11 interposed between them.

The supporting truck comprises the wheels B on an axle 12 mounted in boxes on the lower end of brackets 13 depending from the central portion of the side members of the frame A.

The furrow opener C has an upright portion which extends between the forward ends of the frame A and is secured by bolt 14, a series of perforations 15 being provided therein whereby it may be adjusted into different positions in respect to the tread of the wheel B to make the furrows of the depth desired. Another supporting member 16 is secured thereto at 17 and also projects between the beam members of the frame and is provided with a series of perforations 18 through which a bolt 19 passes to hold the furrow maker at the desired angle and relative position.

The horizontal part of the furrow maker or opener is divided at its rear into two members or mold-boards 45 extending at an angle from each other for a distance and then parallel as best shown in Figure 4, the sides of members 45 being preferably spaced a considerable distance apart in order to form a wide furrow.

The covering disks D are mounted in brackets 21 having pivots 22 on which the disks rotate and their upper ends being connected to the rear ends of the side members of the frame by brackets 23 mounted on pivots 24 and carrying a serrated disk 25 on its rear face which engages with a correspondingly formed disk 26 secured on the upper end of brackets 21. The forward end of the bracket 23 is in the form of a segment and has a series of perforations 27 through which and the side frame member a securing bolt 28 extends. The upper end of the bracket 21 is provided with a bolt 29 which extends through the disks 25 and 26 and the end of bracket 23 and has a nut thereon by which the several parts are securely clamped together. As will be understood, by loosening nut on bolt 29 the disks 25 and 26 may be turned in relation to each other to adjust the angle at which the disks D stand in relation to the direction of the travel of the machine and by adjusting bracket 23, by changing bolt 28 into one or the other of perforations 27 the lower end of brackets 21 will be thrown forward or rearward so that the disks will stand at a different relation in respect to their edges which contact with the ground, thus providing for an adjustment of the disks to secure just the degree of covering desired, the depth to which the disks shall extend into the ground and the angle at which they shall operate in the performance of their duty.

The hopper E is pivoted at 30 on the upper end of brackets 31 secured to the side members of the frame A and has an opening at its bottom terminating in a chute 32 which is of comparatively great width as indicated most plainly in Figure 4. A gate or valve 33 extends across the opening in the hopper and is mounted on a lever 34 pivoted at 35 and extending forward and engaging by an appropriately shaped edge with a notched plate 36 on the side of the hopper, whereby said gate or valve may be adjusted either to close the discharge opening in the hopper completely or open it to that extent which may be desired in the particular operation for which the machine is used. On the rear of chute 32 adjacent to shaft 12 is a cam member 50 and a "knocker" member or agitator 51 is secured to said shaft with projecting surfaces (see Fig. 3) which contact with cam member 50 as shaft 12 rotates and knocks the lower end of chute 32, keeping up a continual jarring action, causing the fertilizer to feed from hopper E down chute 32 and spread across its surface and drop into the furrow between members 45 of the furrow maker in a wide thin stream.

Handles 37 are secured on the sides of the frame by means of bolts 38, brackets 39 and bolts 40 and are adapted to be used in the usual manner by the operator for guiding the machine.

In the operation the fertilizer is placed in the hopper and the machine being propelled by animal power is guided along where it is desired to make a furrow. The furrow opener being adjusted to make a furrow of the depth desired the machine is started in operation. As before explained the furrow opener or maker forms a furrow of comparatively great width and with a practically flat bottom. The rotation of the wheel operates through the knocker to agitate the hopper and jar the fertilizer down the chute which during its descent along the bottom of the chute spreads out to its full width and drops in a thin stream entirely across the bottom of the furrow. The covering disks follow and being adjusted properly turn the amount of soil desired over, in a light condition, on top of the fertilizer leaving the furrow thus prepared ready to receive the seed.

The various adjustments permit the depth of the furrow to be regulated, the quantity of fertilizer to be dropped to be regulated, and the depth and amount of earth to be deposited over the fertilizer to be regulated.

Having thus fully described our said invention, what we claim as new and desire to secure by Letters Patent is:

A fertilizer distributor comprising a frame having side bars, a furrow opener adjustably connected to the frame adjacent the front thereof with a supporting member secured to the furrow opener having adjustable connection with said frame, inverted V-shaped supports mounted on said frame, a hopper having an opening in its bottom pivotally supported between the apices of said supports, handles secured to the frame adjacent the extremity of the forward arm of the V-shaped supports, vertical braces secured to the handles and to the frame adjacent the ends of the other arms of said V-shaped supports, traction wheels fixed to a shaft and supporting said frame beneath the V-shaped supports a cam-wheel intermediate the ends of the shaft, a down-spout on said hopper, means on said down-spout adapted to contact said cam-wheel for vibrating said hopper, an upwardly and rearwardly extending lever pivoted on one side of said hopper having one end adapted to be engaged by a segment carried by said hopper and having its other end connected to a gate for regulating the size of the opening in said hopper.

In witness whereof, we have hereunto set our hands and seals at Wauchula, Florida, this 20th day of August, A. D. nineteen hundred and twenty-one.

VINCE S. POLK. [L. S.]
    JOHN B. HUNT. [L. S.]
    WILMER P. DAVIS. [L. S.]

Witnesses:
    J. A. HUTSON,
    O. P. BARLOW.